United States Patent [19]

Heng et al.

[11] Patent Number: 4,586,843
[45] Date of Patent: May 6, 1986

[54] DEVICE FOR ATTACHING AN OBJECT TO A WALL

[75] Inventors: Jean-Paul Heng, Lyons; André Marmonier, Bron; Etienne Briguet, Rillieux la Pipe, all of France

[73] Assignee: Cgee Alsthom, Levallois-Perret, France

[21] Appl. No.: 584,214

[22] Filed: Feb. 27, 1984

[30] Foreign Application Priority Data

Feb. 28, 1983 [FR] France ............................. 83 03244

[51] Int. Cl.[4] ............................................. F16B 9/02
[52] U.S. Cl. .................................... 403/252; 403/257; 403/256; 248/27.1; 339/128; 24/628; 200/295
[58] Field of Search ................ 248/27.1, 27.3; 24/654, 24/625, 606, 628, 653; 200/295; 339/128; 403/252, 256, 257

[56] References Cited

U.S. PATENT DOCUMENTS

| 2,144,885 | 1/1939 | MacFadden | 24/628 X |
|---|---|---|---|
| 3,681,593 | 8/1972 | Genouese et al. | 248/27.3 X |
| 3,727,021 | 4/1973 | Presis | 200/295 X |
| 3,867,048 | 2/1975 | Endzweig | 403/252 |
| 4,220,808 | 9/1980 | Fujita | 339/128 X |
| 4,440,368 | 4/1984 | Kitchen | 248/27.1 |
| 4,451,720 | 5/1984 | Ludwig | 200/295 X |
| 4,474,489 | 10/1984 | Simon | 403/197 |

FOREIGN PATENT DOCUMENTS

| 269163 | 1/1914 | Fed. Rep. of Germany | 339/128 |
|---|---|---|---|
| 1119940 | 12/1961 | Fed. Rep. of Germany | |
| 1938775 | 2/1971 | Fed. Rep. of Germany | |
| 2816450 | 9/1979 | Fed. Rep. of Germany | |
| 2485280 | 12/1981 | France | |
| 2486176 | 1/1982 | France | |
| 2000912 | 7/1977 | United Kingdom | |

Primary Examiner—Cornelius J. Husar
Assistant Examiner—Joseph A. Fischetti
Attorney, Agent, or Firm—Sughrue, Mion, Zinn, Macpeak & Seas

[57] ABSTRACT

A device for attaching an object to a wall comprises a body with a cylindrical head centrally disposed on a base. The head incorporates longitudinal elastic members terminating in hooks. These are adapted to engage on the edges of an opening in the wall into which the head is inserted. A clamping ring mounted on the head is movable along its length. A spring is disposed between the base of the body and the clamping ring. The force exerted by this spring is transmitted to the wall so as to lock the hooks on to the edges of the opening. Cooperating guide means on the clamping ring and on the body are adapted to guide the clamping ring as it moves along the head, simultaneously rotating. Cooperating locking means on the body and on the clamping ring are adapted to lock the clamping ring in a bottom position on the head. The cooperation of the locking means defines a stable armed position of the device, in which the hooks are spaced from the clamping ring to enable the head to be inserted into the opening in the wall. These locking means are then released by pressure on the clamping ring.

10 Claims, 10 Drawing Figures

DEVICE FOR ATTACHING AN OBJECT TO A WALL

BACKGROUND OF THE INVENTION

1. Field of the invention

The present invention relates to attachment devices which mount in an opening formed in a wall and which may be mounted in this opening from one side only. It relates in particular to the attachment of various apparatus, such as lamps, switches and contacts with, where appropriate, a manual control for the apparatus on the other side of the wall.

2. Description of the prior art

There are already known attachment devices of this kind comprising:

a body equipped with a cylindrical head designed to be inserted and locked into an opening in a wall, locking means comprising retractable claws disposed around the perimeter of and in the vicinity of the end of the cylindrical head and which, when the cylindrical head is inserted into the opening, retract in line with the edges of the latter and then move apart so as to prevent withdrawal of the cylindrical head from the opening, and clamping means disposed in the vicinity of the base of the cylindrical head which cooperate with the locking means to immobilize the cylindrical head in the opening in the longitudinal direction by exerting on the wall forces opposing those exerted by the locking means.

In one known embodiment, the clamping means consist of a ring designed to bear against the wall, fitted to the head below said claws and to the base of the body and urged against the wall by a set of compression springs trapped between the ring and the base of the body.

Devices of this kind, in this embodiment, require of the operator, when they are fitted into the opening in the wall, the deployment of a force sufficient to hold the springs highly compressed, which permits the ring to move away from said claws and likewise the elastic retraction of the latter in line with the edges of the opening, during the proper positioning of the head in the opening. These devices also have the disadvantage of allowing axial displacement within the opening, after they are fitted into it, through compression of the springs, during the fitting of the apparatus which they accommodate, for example, or during work on the apparatus, and capable of leading to the detachment of the control or indicator members mounted on the device in front of the wall.

The object of the present invention is an attachment device which is extremely simple to fit into an opening in a wall and with which all possibility of axial movement after fitting to the wall is eliminated.

SUMMARY OF THE INVENTION

The invention consists in a device for attaching an object to a wall, comprising an attachment body having a base and, centrally disposed thereon, a cylindrical head incorporating longitudinal elastic members terminating in hooks adapted to engage on the edges of an opening in the wall into which said head is inserted, a clamping ring mounted on said head and movable along the length thereof, pressure means disposed between said base of said attachment body and said clamping ring and adapted to exert a force which is transmitted to said wall to lock said hooks on to the edges of said opening, cooperating guide means on said clamping ring and said attachment body adapted to guide said clamping ring as it is moved along said head by rotation of said clamping ring, and cooperating locking means on said attachment body and said clamping ring adapted to lock said clamping ring in a bottom position on said head and to be released by pressure on said clamping ring, said cooperation of said locking means defining a stable armed position of the device in which said hooks are held at a distance from said clamping ring, for insertion of said head into said opening, followed by automatic locking of said hooks on the edges of said opening.

In accordance with another feature of the invention, said attachment body has an upstanding surround and said guide means comprise at least one set of helical ramps and at least one set of cooperating studs on said clamping ring and said surround.

In accordance with another feature of the invention, said locking means consist of abutments formed on the outside surface of said surround cooperating with studs carried by the clamping ring.

In accordance with a further feature of the invention, said clamping ring comprises a circular aperture of substantially the same diameter as said head formed with an oblong notch on its periphery and said head comprises a rigid longitudinal rib on its periphery adapted to fit into said notch.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 1A shows the opening in the wall accommodating the device in accordance with the invention.

DESCRIPTION OF THE PREFERRED EMBODIMENT

Figure 1:
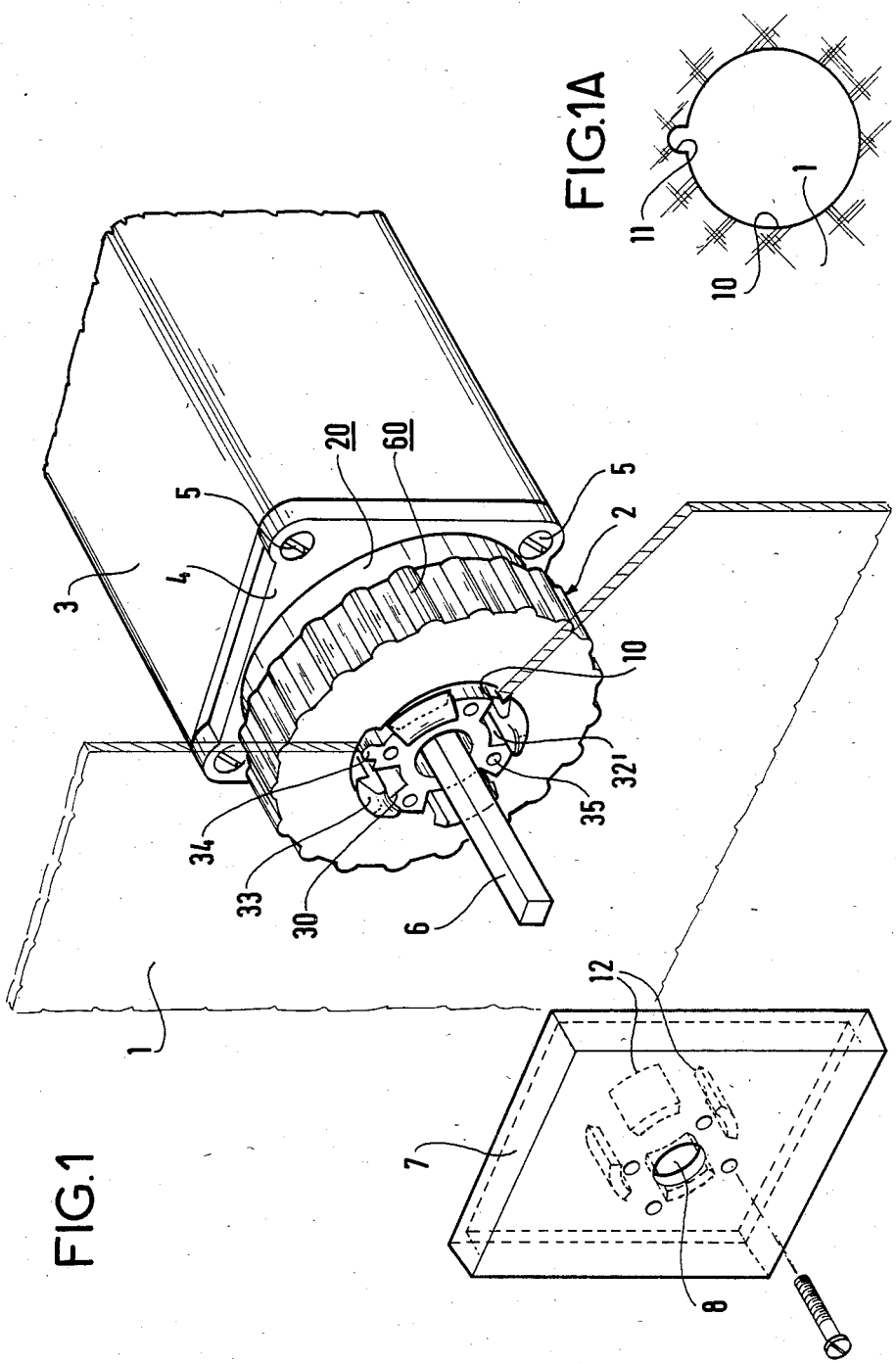
FIG. 1 is a view in perspective of the attachment device in accordance with the invention, fitted to a wall.

FIG. 1 shows part of a wall 1 to which is attached the attachment device 2 in accordance with the invention. The wall 1 has pierced in it a circular opening 10 into which the attachment device 2 is inserted, from the rear of the wall, with only the hook-shaped ends of a cylindrical head 30, seen more clearly in FIG. 2 in particular, engaged with the edges of the front surface of the wall opening 10.

The attachment device 2 is shown supporting, to the rear of the wall, an apparatus 3, for example a rotary switch, whose casing is attached to a plate 4 of the attachment device 2, by means of screws such as 5, and the rotating shaft 6 of which, which is square in cross-section, passes through the attachment device 2 and projects from the front surface of the wall 1.

FIG. 1 also shows a plate 7 for locking the device 2 in the wall which mounts on the attachment device 2 from the front of the wall. It has an opening 8 for the shaft 6 to pass through. The plate 7 also has projecting claws 12 which cooperate with the cylindrical head 30 of the device to prevent the latter being withdrawn from the opening 10 in the wall.

FIG. 1A shows the circular opening 10 in the wall accommodating the attachment device, in order to show more clearly that it features a semi-circular notch 11 on its perimeter. This notch 11 cooperates with the attachment device for positioning purposes and also to prevent it rotating in the opening 10 in the wall.

Figure 2:
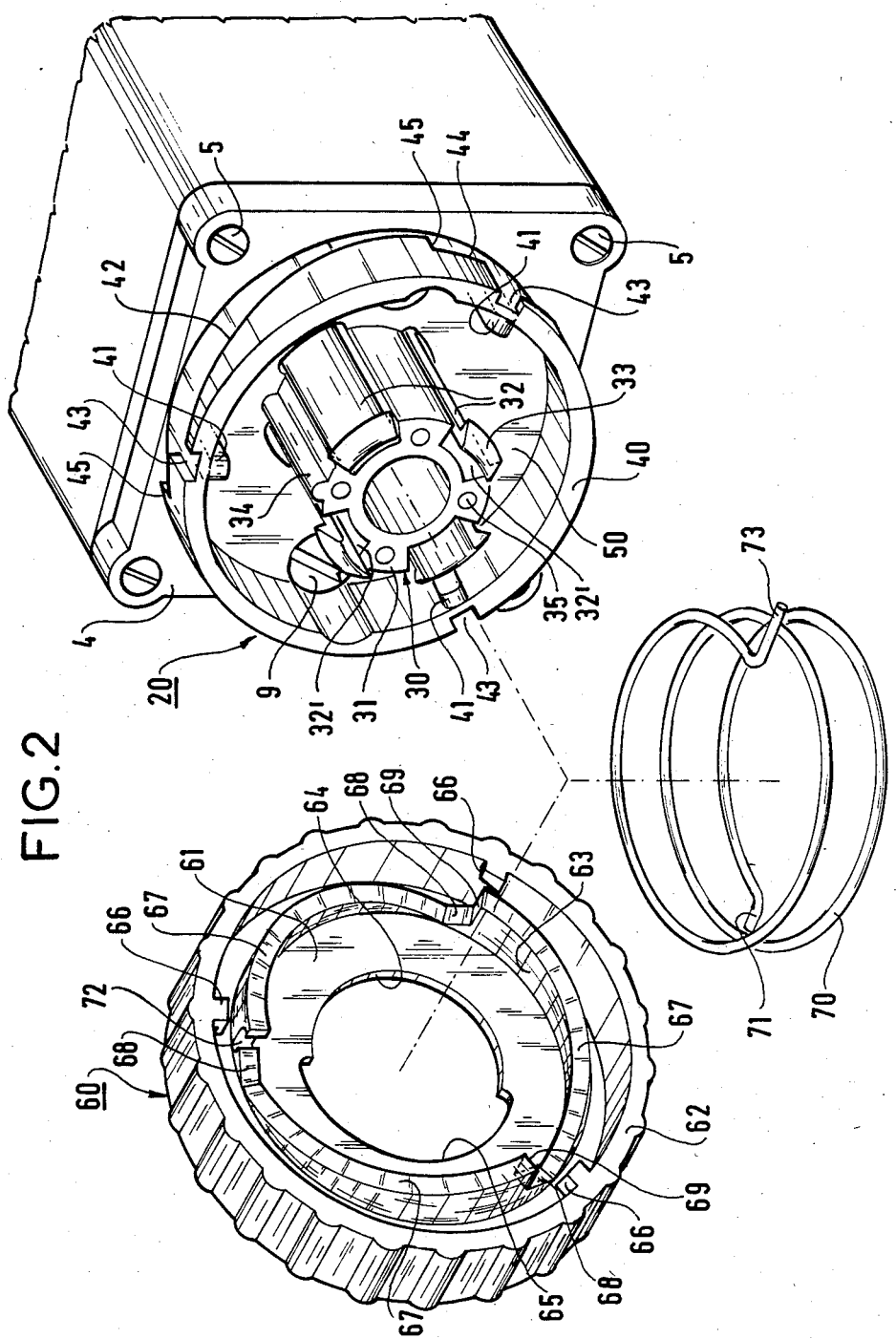
FIG. 2 is an exploded view in perspective of the attachment device in accordance with the invention.

The following description of the attachment device in accordance with the invention is given with particular reference to FIG. 2.

The attachment device comprises:

an attachment body 20 formed by a central cylindrical head 30 and a peripheral surround or sheath 40 which is also cylindrical and referred to as the guide surround, linked to the head by an annular base 50 from which it projects, spaced from the head 30 by a distance substantially equal to half the length of the latter, a clamping ring 60 which can be threaded over the head 30 to "cap" the guide surround 40, and a cylindrical spring 70 with non-contiguous turns adapted to function in torsion and in compression which mounts around the head 30 in the housing defined between the guide surround 40 and the head 30 and closed on the one hand by the base 50 and on the other hand by the clamping ring 60.

The attachment body 20 and the clamping ring 60 are advantageously made of plastics materials.

The plate 4 for attaching the device 3 is in this instance attached to the back of the annular base 50 of the attachment body 20 and is retained thereon by screws such as 9. This plate 4 advantageously projects beyond the guide surround to facilitate the attachment of the apparatus 3. As an alternative arrangement, the plate 4 could be part of the attachment body 20, defining the aforementioned annular base 50 or a base projecting beyond the guide surround 40.

In cross-section, the central head 30 is in the shape of a ring provided with non-contiguous radial branches 31 regularly spaced around its periphery, four in number in this instance, to stiffen it, and retractable elastic members or tangs 32 disposed between the branches 31 on the periphery of the head. These retractable elastic members or tangs 32 are each spaced from the central ring by a gap 32′ and they are attached to the head of which they form part at the end adjacent the annular base 50. The free ends of these members, extending out of the guide surround 40 at the opposite end from the base 50, form hooks 33. These hooks are directed towards the outside of the head and project from its periphery to hook it onto the edges of the wall at the opening 10 accommodating the attachment device, as shown in FIG. 1. When the head is inserted into the opening in the wall, these hooks are first pushed back towards the inside of the head by the edges of the opening, and then released, spreading apart again to form peripheral abutments preventing the head being withdrawn from the opening in the wall.

The central head 30 further comprises a longitudinal and semicircular rib 34 extending over the length of one of its peripheral branches and projecting in relief from the periphery of the cylindrical head. This rib 34 cooperates in particular with the notch 11 in the opening 10 (FIG. 1A), for positioning and retaining the attachment device in the opening in the wall in the radial direction. The head also has on its end surface bores 35 providing for the immobilization of the plate 7 (FIG. 1).

The peripheral guide surround 40 defines with the central head 30 to which it is joined by the base 50 part of a housing for the spring 70 which, when unstressed, bears lightly against its internal wall. It comprises, in the vicinity of the base 50, an opening (not visible in FIG. 2) to accommodate one end 71 of the spring, bent towards the outside, in order to retain the spring when loaded in torsion and urged more forcefully against its internal wall.

The surround further comprises three regularly spaced studs 41 projecting from its inside wall over its full height, extending parallel to its generatrices. It also comprises three helical ramps 42 projecting from its external wall and in regular progression, the three ramps being identical to one another. Each of these ramps 42, referred to as an upward ramp, extends on the periphery of the surround, in the anticlockwise direction, substantially from the edge adjoining the annular base 50 to the opposite edge of the outside wall of the surround, beginning with a slight peripheral offset relative to the position of one of the internal studs 41 and terminating substantially in line with the next stud. The surround further comprises three notches 43 formed in the outside wall in line with the three internal studs, in each of which terminates one of the upward ramps 42. With each of these upward ramps 42 there is further associated a retaining step 44 formed at substantially the halfway point on the height of the outside wall of the surround in the region of peripheral offset between the ramp in question and the internal stud 41 or the non-adjoining notch 43. This retaining step 44 is set back from the starting point of the ramp in question, with which it forms an abutment 45.

The clamping ring 60 threads on to the central head 30 and caps the peripheral surround 40, completing and closing the housing for the spring 70. It comprises an annular part 61, a peripheral cylindrical part 62 and an internal cylindrical part 63. The two cylindrical parts 62 and 63 extend from the same side of the annular part 61 and are separated from one another by a distance substantially equal to the thickness of the surround, over which they are engaged internally and externally.

The annular part 61 comprises a circular opening 64, the diameter of which is substantially equal to that of the central head. This opening 64 is provided with an oblong notch 65 extending over substantially one third of its periphery and with a depth substantially equal to the height of the external rib 34 carried by the head 30, which locates in it.

The peripheral cylindrical part 62 comprises adjacent its edge three regularly spaced studs 66 projecting in relief from its internal wall. The external wall of this peripheral part 62 is advantageously ribbed, as shown, to provide a better grip and to facilitate manual operation of the clamping ring 60.

The internal cylindrical part 63 comprises three helical ramps 67 referred to as downward ramps. These ramps follow on regularly from one another on the edge of the part 63. With each ramp there is associated an inclined surface 68, with the opposite inclination to that of the ramp, of which it forms an extension at its lowest point, that is to say at the point nearest the annular part 61. Each of these inclined surfaces 68, which serve as guides on locking the clamping ring 62 to the attachment body 20, is set back from the adjoining ramp, of which the edge constitutes an abutment 69. The internal cylindrical part 63 is further provided with a slot 72 for retaining the second end 73 of the spring 70, which is bent toward the outside of the spring. This slot 72 is formed in the edge of one of the downwards ramps constituting the abutment 69, extending slightly below the adjoining inclined guide surface 68 and open at the point of intersection of this inclined surface and this edge to facilitate the insertion of the end 73 of the spring.

Figure 4:
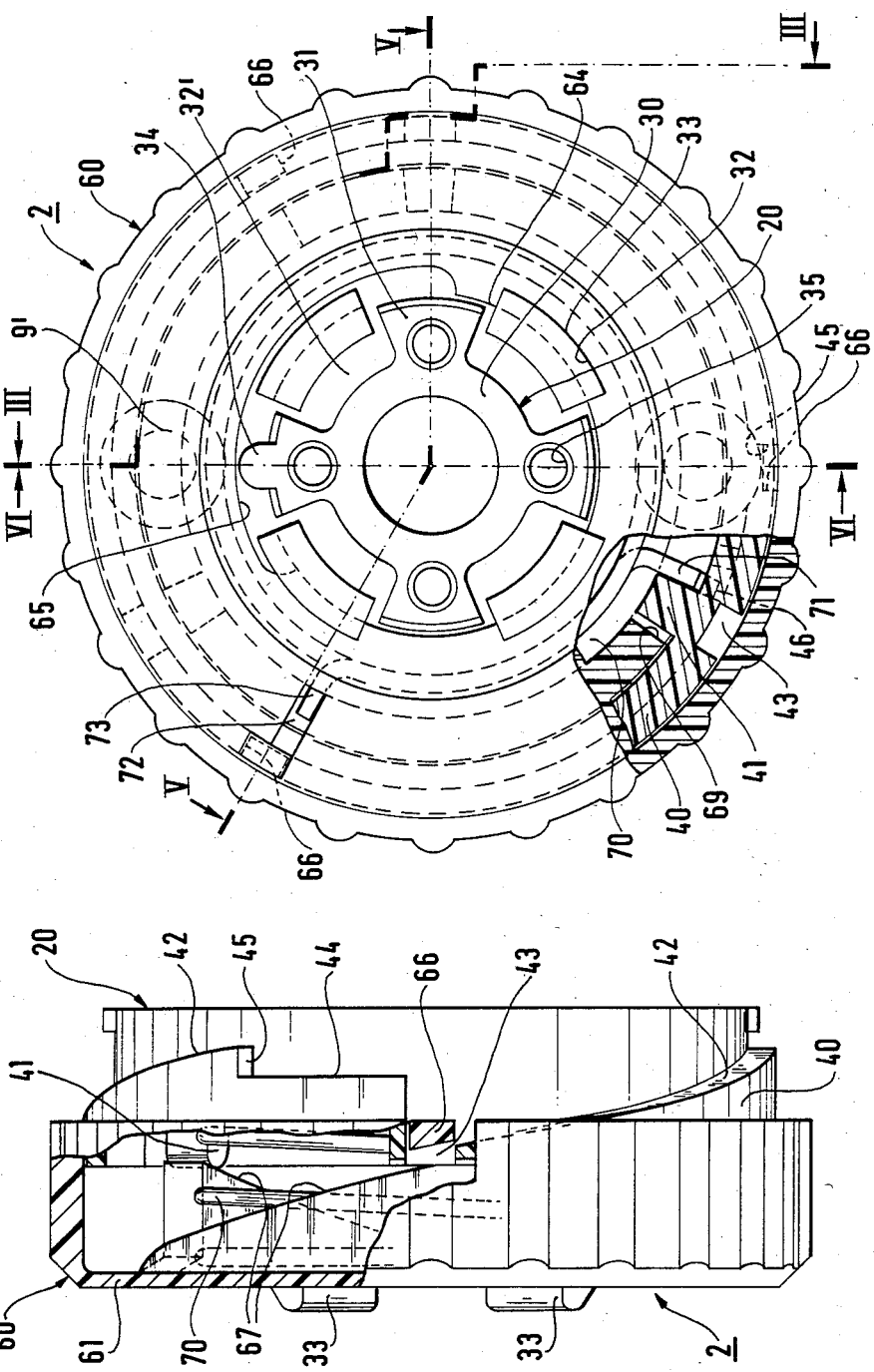
FIG. 4 is a partially cutaway view of the attachment device in an armed position.
Figure 3:
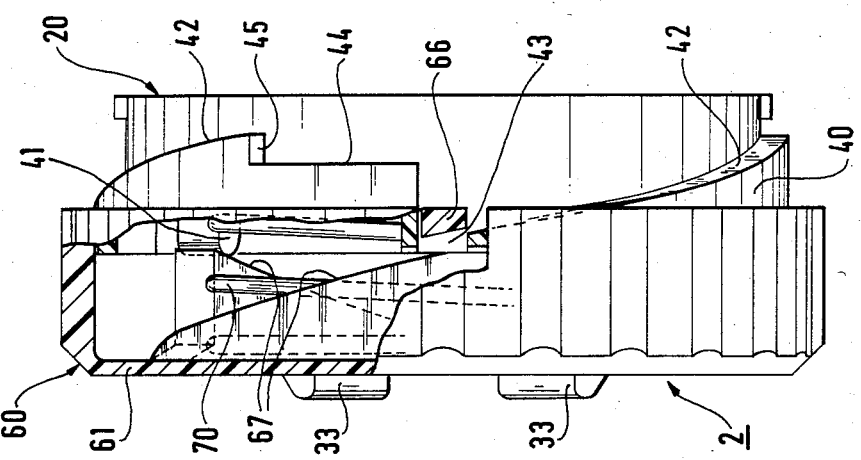
FIG. 3 is a view in elevation in partial cross-section on the line III—III in FIG. 4 of the attachment device in a triggered position.

FIGS. 3 and 4 are two views of the attachment device shown in so-called armed position (FIG. 4) and another, so-called triggered position (FIG. 3), in which component parts previously mentioned are designated by the same reference numbers. These two figures are used to complete the description of the attachment device given hereinabove with reference to FIG. 2, and to specify the cooperative relationships between the component parts.

With reference to these figures, it is seen that the studs 66 carried by the clamping ring 60 cooperate with the ramps 42 on the peripheral surround 40 and that the studs 41 on this surround cooperate with the ramps 67 on the clamping ring. The two sets of ramps are parallel to one another and substantially aligned with one another, the slight offset preventing jamming of the ramps between the studs which cooperate with them, which could lead to immobilization of the clamping ring 60 on the attachment body 20 at a random position.

FIG. 4 in particular clearly shows the relationship between the diameter of the central head 30 and the diameter of the opening 64 in the clamping ring 60 which accommodates it. The central head 30, in the form of a ring with separate rigid peripheral branches 31, is of substantially the same diameter as the opening 64, ignoring the oblong notch 65 associated with this opening. When unstressed the inwardly retractable hooks 33 are engaged with the edges of the opening 64, with the exception of the one of or the parts of these hooks opposite the notch. It is also seen that this notch 65 is designed to accommodate the longitudinal rib 34 carried by one of the rigid branches 31 and defines the possible path of radial movement of this rib.

FIG. 4 also shows, in the cutaway part, the aforementioned retaining hole 46 accommodating the end 71 of the spring 70. This retaining hole 46 is formed in the thickness of the surround 40, in the vicinity of the annular base 50, and is advantageously positioned to the rear of one of the internal studs 41, relative to the direction of the turns of the spring, so as to reinforce the retention of the spring 70 in the surround. Bores 9' in the annular base 50 receive the screws for attaching the retaining plate of an apparatus (not shown) to the rear of the base.

FIG. 3 shows the device in the so-called triggered position. This position corresponds to the fitting of the clamping ring 60 on the attachment body 20 and to the stable resting of the clamping ring 60 on the attachment body under the action of the internal spring 70 and the two sets of ramps 42 and 67 and the corresponding studs 66 and 41. In this position, the clamping ring 60 is retained on the attachment body 20 by the hooks 33. The studs 66 on the ring 60 are then located in line with the notches 43 in the peripheral surround 40, and the studs 41 on the surround bear on the tops of the downward ramps 67 on the ring 60. Because of the opposed abutments in the form of the hooks 33 and the studs 41, this triggered position of the device is a stable one.

FIG. 4 shows the device in the so-called armed position. In this position, which is also a stable position, the clamping ring 60 is retained on the attachment body 20 by the action of the studs 66 on the clamping ring which are located on the retaining steps 44, in bearing engagement with the abutments 45 defined by the ramps 42 and these steps 44, while the studs 41 on the surround 40 are disposed slightly ahead of their own respective abutments 69 defined by the ramps 67 on the clamping ring 60.

The fitting together of the component parts of the attachment device, shown separately in FIG. 2, will now be briefly described with reference to FIGS. 2 to 4, being deduced from the representation given in FIG. 3. The spring 70 is threaded over the central head 30, its end 71 being inserted into its retaining hole; the spring bears lightly against the peripheral surround 40 and is housed between the surround and the head of the attachment body. The clamping ring 60, into the slot 72 in which the spring end 73 is inserted, is then itself threaded over the central head 30, the hooks on which are pushed back inwardly on passing into the opening 64. To fit the ring the studs 66 on the ring are lined up with the notches 43 in the surround, so that they can engage therein, allowing the hooks to escape beyond the opening in the ring, and the longitudinal rib 34 is lined up with the notch 65 associated with the opening 64 in the ring. Lining up the studs with the notches and the rib with its notch in the ring involves, and this constitutes an advantage, slight twisting of the spring 70 to retain it firmly between the ring, the surround and the central head, and proper retention of the clamping ring 20 without clearance under the hooks 33.

The attachment device is altered from this triggered position (FIG. 3), which is that which results from the fitting together of its component parts, to its armed position (FIG. 4) by rotating the clamping ring to slide the studs 41 on the surround 40 along the downward ramps 67 on the ring 60. At the same time, the longitudinal rib 34 moves through the notch 65 associated with the opening 64, the spring is twisted and the studs 66 move along the ramps 42. At the end of the movement of the studs 41 along their ramps 67, when they arrive at the abutments 69, the guide surfaces 68 cause a slight upward movement of the clamping ring 60 on the attachment body 20. The studs 66 are then located in line with the retaining steps 44 and are locked behind the abutments 45 on releasing the clamping ring, which is accompanied by a slight retrograde movement because of the spring 70. The device is then in the armed position, in which it is ready to be fitted into a wall, as shown in FIG. 5.

Figure 5:
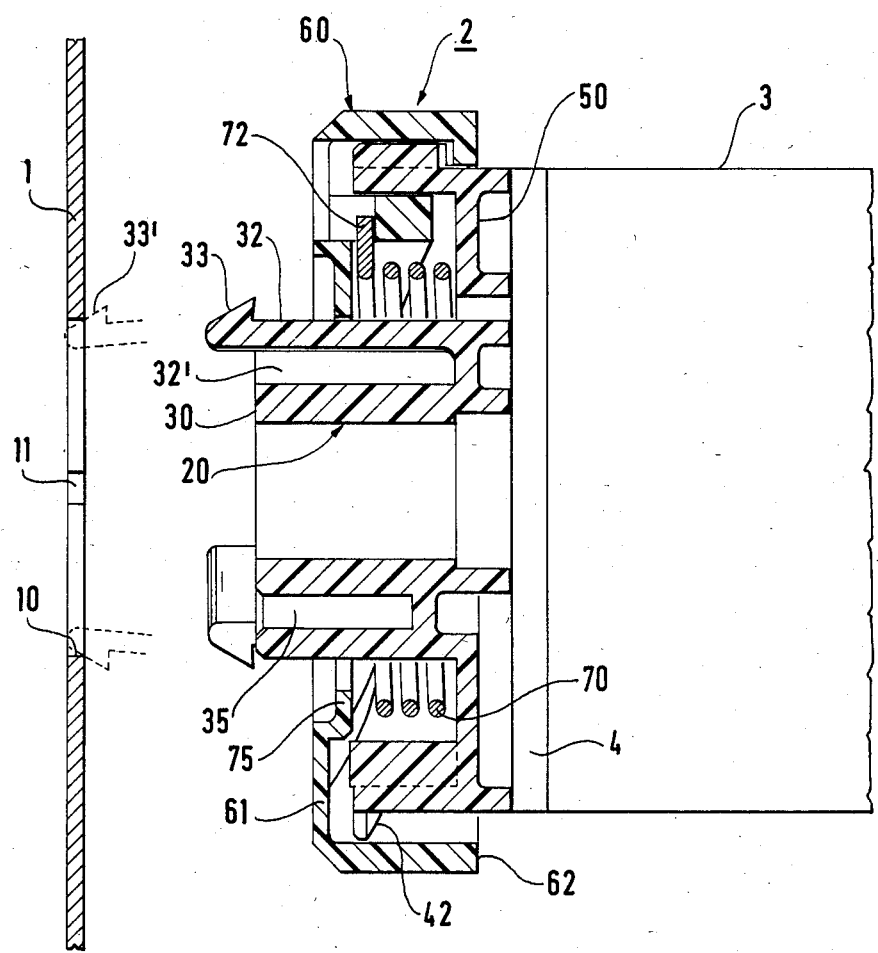
FIG. 5 is a view in cross-section on the broken line V—V in FIG. 4 of the device in the armed position.

FIG. 5 shows that in this armed position the external cylindrical part 62 of the clamping ring 60 covers substantially all of the peripheral surround 40 and is in its "bottom" position thereon. The ring then permits part of the length of the elastic members 32 and the hooks 33 to project considerably beyond its annular part 61. As this armed position of the device is a stable position, it is a simple matter to fit the attachment device to the wall 1, the hooks 33 retracting when they contact the edges of the opening 10, as shown symbolically in dashed line 33' in the position at which they enter the opening.

In this armed position of the device the spring 70 is highly compressed in its housing, which is reduced in height at this time. The internal part 75 of the annular part 61 of the clamping ring is advantageously set back towards the inside of the ring in order to ensure, in conjunction with the edge of the surround 40, proper closure of the housing for the spring 70.

Figure 6:
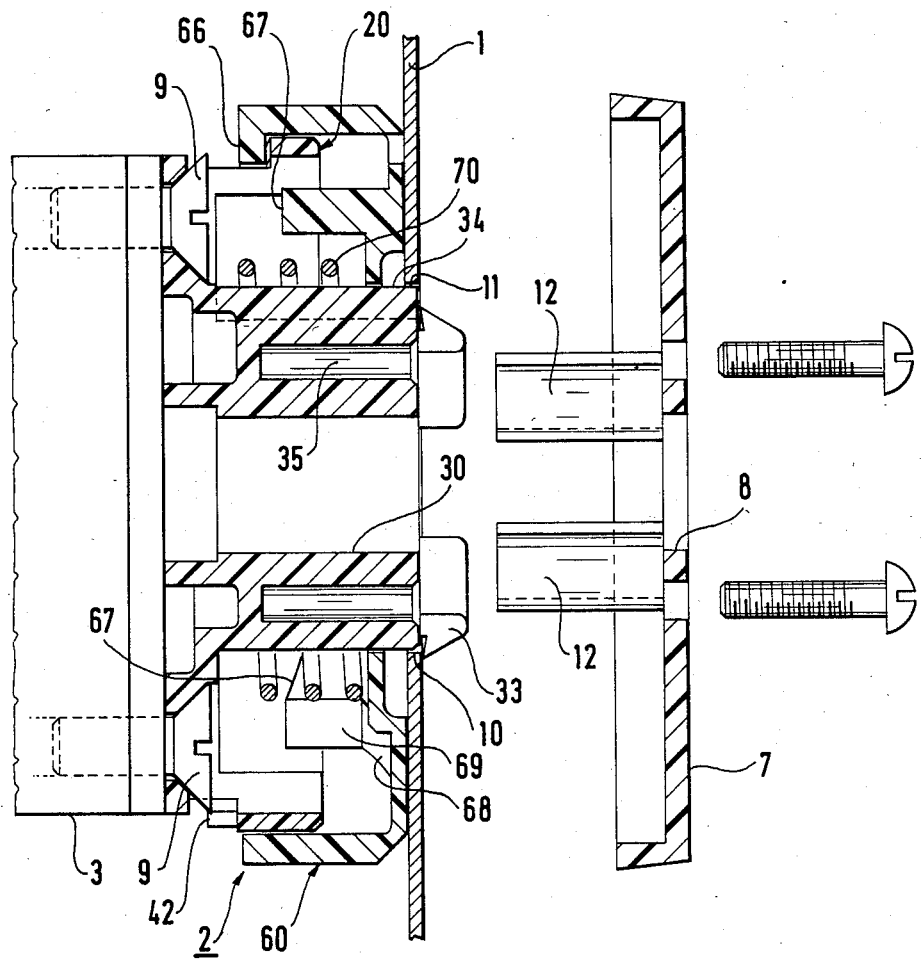
FIG. 6 is a view in cross-section on the line VI—VI in FIG. 4 of the device in the triggered position.

FIG. 6 shows the attachment device 2 in place, engaged on the wall 1. The clamping ring 60 has risen up the surround 40; its annular part 61 and the hooks 33 of the head 30 grip the wall 1. The device 2 can only be detached from the wall 1 to which it is fitted by manual disengagement of the hooks 33 from the edge of the opening in the wall, by urging them towards the inside of the head. Manual and accidental removal are prevented by the locking plate 7. The separate claws 12 projecting in a ring from one side of this plate are adapted to engage within the central head 30, underneath the elastic members 32, preventing them moving inwards.

Figure 7A:
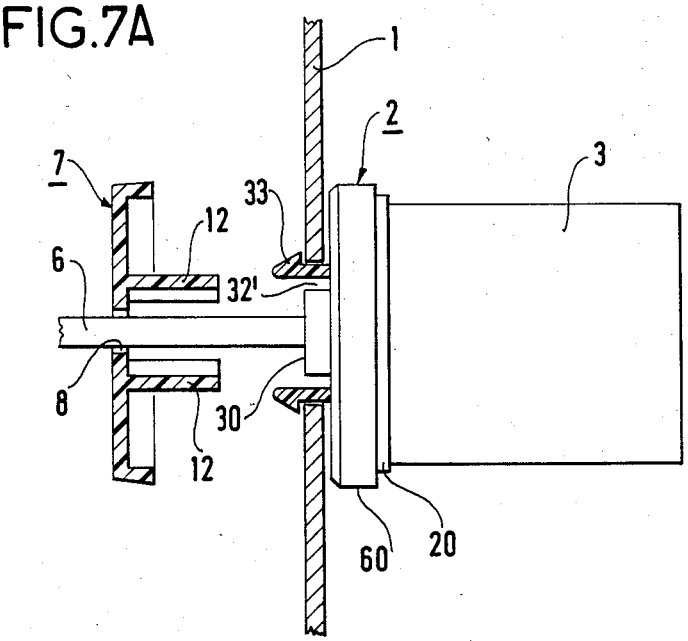
FIGS. 7A and 7B are schematic views of the attachment device in accordance with the invention, respectively during and after its fitting into the opening in the wall.
Figure 7B:
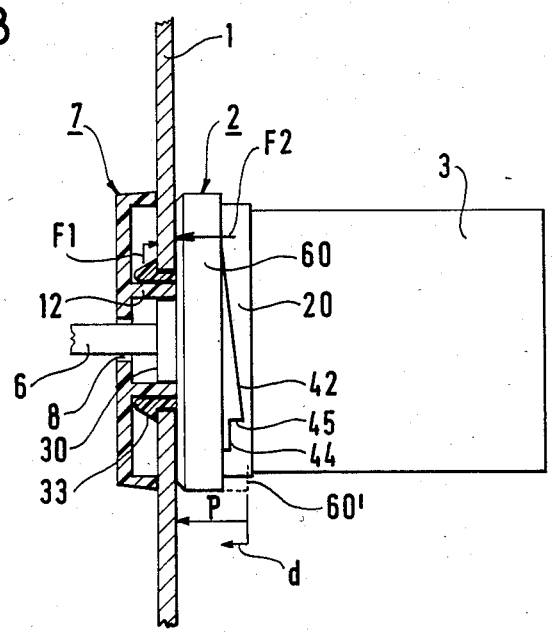

FIGS. 7A and 7B schematize the fitting of the attachment device to its immobilization in the wall. FIG. 7A corresponds to FIG. 5 in that the device remains in the armed position as it is inserted into the opening in the wall 1, until the clamping ring comes into contact with the wall. FIG. 7B corresponds to FIG. 6; the arrow P indicates the pressure exerted by the clamping ring 60 on the wall 1, at the end of insertion of the device into the opening, at which time the ring is in the bottom position on the surround, indicated in dashed line 60', and the arrow d shows the upward movement of the clamping ring on the surround as a result of this initial pressure P. Also shown are the opposite forces $F_1$ and $F_2$ exerted by the hooks 33 and the clamping ring 60 on the wall 1, when the ring is in its "top" position on the surround, these forces holding the device onto the wall.

With reference to FIG. 7B, in which the plate 7 is shown fitted to the attachment device 2, it is clearly seen that the claws 12 engaged beneath the elastic members 32 prevent any axial movement of the latter, which are retained between the edges of the opening and the claws and lock the hooks 33 in the position in which they are engaged with the edges of the wall 1 at opening 10.

Figure 8:
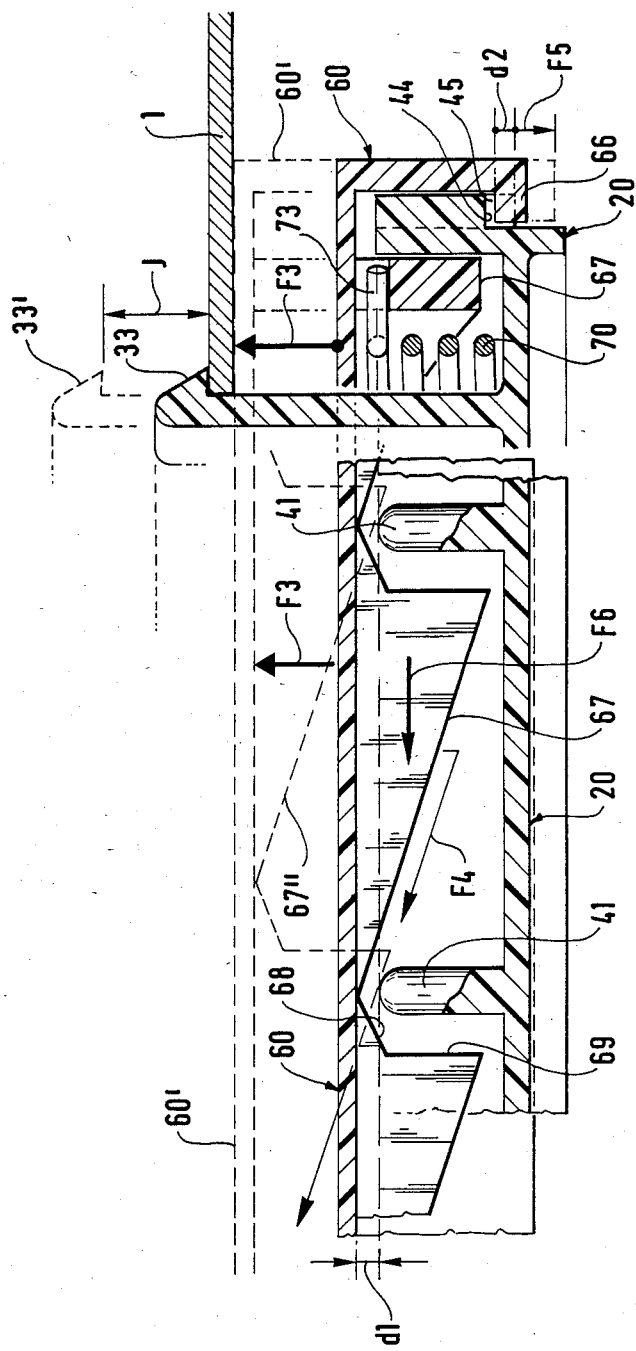
FIG. 8 is a partially developed view in cross-section of the attachment device in accordance with the invention, illustrating how it operates.

An explanation of how the attachment device is altered from its armed position to its triggered position will now be given with specific reference to FIG. 8. FIG. 8 shows the attachment device in the armed position during insertion into the opening with the hooks 33 just extending over the edges of the wall 1 at opening 10, the position of the device at the end of its insertion into the opening in the wall being shown in dashed line, for which the component parts are indicated by their previous reference numeral followed by a single prime mark. FIG. 8 also incorporates a partial view in cross-section encompassing one of the studs 66 on the clamping ring 60 against one of the abutments 45 separating their ramps and the steps (not visible) formed on the surround 40, and a partial developed view encompassing one of the ramps 67 on the clamping ring and the parts of the adjoining ramps and their studs 41 on the surround 40, completing the inter-relationship between the two sets of ramps and their respective studs.

Referring to FIG. 8, the arrow $F_4$ is a schematic representation of the positioning of the device in the armed position, in which the stud 41 on the surround bears on its ramp 67 and has caused, following contact with the abutment 69 and a slight retrograde movement, the stud 66 to contact the abutment 45 on the step which retains it on the associated ramp. There is shown for the resulting armed position of the device the position of each of the studs 41 opposite the intersection between its ramp 67 and its guide surface 68. These studs 41 and their ramps are then separated by a clearance $d_1$ which is produced by the guide surfaces cooperating with the studs 41 and the released spring which now holds the stud 66 against its retaining step, behind the abutment 45 which is of height $d_2$ substantially equal to clearance $d_1$. The arrow $F_3$ indicates the full insertion and pressing of the device into the opening, which automatically unlocks the device which passes from the armed position to the triggered position.

Given the forceful contact of the clamping ring 60' with the wall 1, the latter exerts a reaction force which is transmitted to the ring 60' which causes its studs to move until they are disengaged from their abutments. The arrow $F_5$ represents the movement of the ring 60 resulting from the force exerted on it to disengage its studs such as 66 from behind their respective abutments. As soon as the studs 66 have escaped completely from their abutments 45, the clamping ring is unlocked. Under the action of the spring, which functions at this time in torsion, as represented schematically by the arrow $F_6$, the released clamping ring turns, remaining in contact with the wall, and therefore pushing back, in the direction away from the rear of the wall, the surround and the central head of the attachment body 20, so as to eliminate the clearance J between the hooks 33' and the front surface of the wall. During this rotation of the clamping ring produced by the spring 70, the attachment body 20 is prevented from rotating in the opening in the wall by its longitudinal rib 34 (FIG. 4) which is located in the notch 11 associated with the opening 10 in the wall (FIG. 1). Simultaneously, the sliding movement of the attachment body 20 in the opening in the wall results from the guiding of the studs along their respective helical ramps, until the device is locked to the wall.

When the device is locked into the thickness of the wall 1, by virtue of the residual reaction force applied by the spring 70, which has not expanded completely, rotation of the guide ring can no longer continue; the studs are then immobilized on their respective ramps, short of the end of their maximum travel, as represented schematically by the studs 41 resting on their ramps 67". The bearing of the studs on their respective ramps, which are of shallow slope, prevents reversal of the operation of the device when fitted to the wall and thus any axial movement of the device within the opening in the wall.

It will be understood that various changes in the details, materials and arrangements of parts, which have been herein described and illustrated in order to explain the nature of the invention, may be made by those skilled in the art within the principle and scope of the invention as expressed in the appended claims.

It is claimed:

1. A device for fixing an object on a wall having an opening therein, said device comprising:
    an attachment body (20) having a base (50),
    a cylindrical head (30) disposed centrally on said base, peripheral elastic members (32) terminating in end hooks (33) projecting from said head for engaging said wall about said opening, a cylindrical sheath (40) fixed to said base and surrounding said head over a part of the length of said head, a clamping ring (60), mounted on said head and movable along the length thereof, means (67, 41; 42, 66) carried by said ring and said sheath for translatably guiding said ring relative to said head and for rotatably driving said ring, means (45, 66) for locking said clamping ring in a low position on said head, connected to said guiding means for unlocking by pressure exerted by said wall on said ring with the insertion of said head in the opening of the wall, and a resilient coupling means (70) connecting said attachment body and said clamping ring and opposing the action of the ring to place it in the low position on the head and for causing rotatable movement of said ring during unlocking of said locking means in order to enclose said wall between said ring and said hooks.

2. A device according to claim 1, wherein said attachment body sheath is upstanding and said guide means comprise at least one set of helical ramps and at least one set of cooperating studs on said clamping ring and said sheath.

3. A device according to claim 2, wherein said clamping ring comprises a cylindrical internal member having an outside diameter which is substantially equal to the internal diameter of said sheath, wherein said guide means comprise a first set of helical ramps on said cylindrical internal member, and wherein said guide means further comprise a first set of studs on the inside of said sheath.

4. A device according to claim 3, wherein said locking means comprise a set of retaining abutments formed on the outside of said sheath and disposed on the periphery of the device, in positions substantially corresponding to those of the respective end parts of the ramps of said first set of ramps, and a second set of studs formed on the inside of said peripheral cylindrical part of said clamping ring.

5. A device according to claim 4, wherein said locking means further comprise a set of retaining steps formed adjacent respective abutments on the outside wall of said sheath and said second set of studs engage said steps at the end of movement of said first set of studs over said first set of ramps.

6. A device according to claim 5, further comprising guide surfaces formed on said cylindrical internal part of said clamping ring and each linking, with the opposite inclination, the end part of one ramp of said first set to the next ramp and forming an abutment on the guide surfaces concerned, respective studs of said first set of studs engaging said guide surfaces to bring about the engagement of the second set of studs with their retaining steps and their immobilization against their own respective abutments.

7. A device according to claim 6, wherein the height of the abutments on said sheath is not more than the clearance between each stud of said first set of studs and the end part of the associated helical ramp, at the point of intersection with the corresponding guide surface.

8. A device according to claim 2, further comprising a second set of helical ramps formed on the outside wall of said surround.

9. A device according to claim 1, wherein said ring comprises a circular aperture of substantially the same diameter of said head formed with an oblong notch on its periphery and wherein said head comprises a rigid longitudinal rib on its periphery fitting said notch.

10. A device according to claim 1, wherein said resilient coupling means comprises a spring with non-contiguous turns functioning in torsion and in compression, disposed around said head with respective ends anchored to said attachment body and to said clamping ring.

* * * * *